United States Patent [19]
Rubinsztajn et al.

[11] Patent Number: 5,510,430
[45] Date of Patent: Apr. 23, 1996

[54] METHOD OF FUNCTIONALIZING ORGANOSILOXANE CONDENSATION PRODUCTS

[75] Inventors: Slawomir Rubinsztajn, Schenectady; Jeffrey H. Wengrovius, Scotia, both of N.Y.

[73] Assignee: General Electric Company, Schenectady, N.Y.

[21] Appl. No.: 414,166

[22] Filed: Mar. 31, 1995

[51] Int. Cl.⁶ .................................................. C08F 283/00
[52] U.S. Cl. ............................................ 525/478; 525/477
[58] Field of Search ..................................... 525/477, 478

[56] References Cited

U.S. PATENT DOCUMENTS

| | | |
|---|---|---|
| 4,584,355 | 4/1986 | Blizzard et al. . |
| 4,585,836 | 4/1986 | Homan et al. . |
| 4,591,622 | 5/1986 | Blizzard et al. . |
| 4,655,767 | 4/1987 | Woodard et al. . |
| 5,319,040 | 6/1994 | Wengrovius et al. . |

OTHER PUBLICATIONS

"Silicones" in Encyclopedia of Polymer Science and Engineering (1989 ed), vol. 15, pp. 204–207, John Wiley & Sons, NY.

*Primary Examiner*—Melvyn I. Marquis
*Attorney, Agent, or Firm*—William H. Pittman

[57] ABSTRACT

An MQ resin is functionalized by heating with a functionalized organosilicon material such as a disiloxane or halosilane in the presence of a linear phosphonitrilic halide, a short chain linear phosphazene or a strong acid such as trifluoromethanesulfonic acid.

9 Claims, No Drawings

METHOD OF FUNCTIONALIZING ORGANOSILOXANE CONDENSATION PRODUCTS

BACKGROUND OF THE INVENTION

The present invention relates to a method of modifying certain organosiloxane copolymers, sometimes referred to as "MQ" resins. Such resins are condensation products comprising Q and M units, so designated employing the art-recognized convention for designating organosiloxane structural units in accordance with the number of oxygen atoms attached to silicon is employed herein. That convention uses the letters M, D, T and Q to designate said number of oxygen atoms as abbreviations for "mono", "di", "tri" and "quatro".

More particularly, the present invention relates to the use as a catalyst of a linear phosphonitrilic halide (LPNX) where X is a halogen atom and preferably chloro, a short chain linear phosphazene (SCLP) or a strong acid in contact with a mixture of an MQ resin and a functionalized organosilicon material. A reduction is effected in SiOH content, along with an exchange reaction between the MQ resin, whose core Q unit structure remains substantially intact during the reaction, and the functionalized organosilicon material having units such as $H(CH_3)_2SiO$—, $CF_3CH_2CH_2(CH_3)_2SiO$—, $C_6H_5(CH_3)_2SiO$— or $CH_2=CH(CH_3)_2SiO$—.

Various techniques are constantly being evaluated for introducing functionality into MQ silicone resins and decreasing the proportion of by-products therein containing silanol groups. Some uses for functionalized MQ resins are as crosslinking agents and as reinforcing fillers in optically clear products. In addition, applications based on a deep section cure or liquid injection molding (LIM) often use functionalized MQ resins with a platinum catalyst. Pressure sensitive adhesives (PSA's) also can use a functionalized MQ resin in combination with a network Si—H and Si-vinyl package, employing a peroxide or platinum curing catalyst.

As shown in U.S. Pat. 5,319,040, substantially silanol-free MQ resin powder can be prepared by treating a organic solvent dispersion of a silanol-containing MQ resin with an organosilicon-nitrogen material, such as a silylamine or organosilazane. The resulting resin can be used in making heat-curable silicone compositions after it has been spray dried. The MQ resin can include M units having functional groups such as $H(CH_3)_2SiO$— and $CH_2=CH(CH_3)_2SiO$—.

U.S. Pat. 4,585,836, directed to a PSA, uses a silanol-containing resin copolymer having M and Q units. The copolymer can be made by treating a silica hydrosol at a low pH with a triorganosiloxy unit source, which can be a disiloxane or chlorosilane having functional groups. U.S. Pat. 4,584,355 shows the use of a functionalized organonitrogen end-blocking agent, such as a silazane, to reduce the level of silanol while introducing functional groups into a silanol-containing MQ resin.

Although various procedures are available for decreasing silanol proportion in and introducing functionality into MQ resins, methods involving the direct treatment of a silica hydrosol at a low pH with a triorganosiloxy unit source are economically unattractive, since considerable loss of triorganosiloxy units can occur during the hydrolysis step. Introduction of functional groups using a functionalized organonitrogen end-blocking agent also are somewhat limited, since they are based on the silanol content of the MQ resin.

In view of the strong demand for functionalized MQ resins, additional procedures for making such resins are constantly being evaluated.

The present invention is based on the discovery that functionalized MQ resins can be made by effecting an exchange reaction between triorganosiloxy groups free of functionality, such as trimethylsiloxy, on the surface of a preformed MQ resin, and certain functionalized organosilicon materials selected from organohalosilanes and organosiloxanes, such as disiloxanes. One feature of the invention is that a substantial reduction in the level of SiOH groups on the MQ resin surface can occur simultaneously with such exchange. Further, exchange can be facilitated without penetrating the MQ resin core structure by using an effective amount of a catalyst such as a LPNX, a SCLP or a strong acid such as trifluoromethanesulfonic acid (triflic acid).

SUMMARY OF THE INVENTION

The invention is a method for making a substantially silanol-free functionalized MQ resin which comprises effecting reaction between (A) 10 to 100 parts by weight of a functionalized organosilicon source material having radicals selected from the group consisting of dialkylsilyl, alkenyldialkylsilyl, aryldialkylsilyl and haloalkyldialkylsilyl, and (B) 100 parts by weight of an MQ resin having about 30–70 mole percent of M units based on total silicon-containing units, in the presence of about 10–10,000 ppm of a catalytic material comprising a linear phosphonitrilic halide, a short chain linear phosphazene or a strong acid.

DETAILED DESCRIPTION; PREFERRED EMBODIMENTS

Organic radicals which may be bonded to silicon in the MQ resins employed according to the present invention include $C_{1-12}$ alkyl radicals, such as methyl, ethyl, propyl, butyl and pentyl; haloalkyl such as trifluoropropyl; cyanoalkyl, such as cyanoethyl; and corresponding aryl- and preferably phenyl-containing units. Hydrogen atoms bonded to silicon may also be present.

Linear phosphonitrilic halides which can be used in the practice of the invention are preferably the corresponding chlorides (LPNC) having the formula

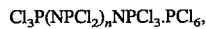

$Cl_3P(NPCl_2)_nNPCl_3 \cdot PCl_6$, where n is 0–4 and preferably 1 or 2. These phosphonitrilic chlorides can be made by procedures described in U.S. Pat. 3,839,388 incorporated herein by reference. There can also be used SCLP's such as those of the formulas $OCl_2P(NPCl_2)_nNPCl_3$, $OCl_2P(NPCl_2)_nNPCl_2OH$ and $OCl_2P(NPCl_2)_nN(H)P(O)Cl_2$, where n is 0–3; and strong acids (i.e., acids having a negative $pK_a$) such as trifluoromethanesulfonic (triflic) acid.

The MQ resin used in the practice of the invention can be prepared in accordance with the procedure shown in U.S. Pat. 2,676,182. For example a silica hydrosol may be treated at a low pH with a source of $(R)_3SiO$— units such as trimethylchlorosilane or hexamethyldisiloxane. Such MQ resins can contain about 0.2–5.0% by weight of silanol groups. If desired, the silanol-containing MQ resin can be spray-dried to reduce the silanol content in accordance with the method of U.S. Pat. 5,324,806.

Functionalized organosilicon source materials include organohalosilanes such as $H(CH_3)_2SiCl$, $CH_2=CH(CH_3)_2SiCl$, $C_6H_5(CH_3)_2SiCl$ and $CF_3(CF_2)_mCH_2CH_2(CH_3)_2SiCl$ where m is from 0 to 11 and preferably 0 or 5, and the corresponding bromides and fluorides, and hexaorganodisiloxanes such as $(CH_3)_3SiOSi(CH_3)_3$, $H(CH_3)_2SiOSi(CH_3)_2H$, $CF_3(CF_2)_mCH_2CH_2(CH_3)_2SiOSi(CH_3)_2CH_2CH_2(CF_2)_mCF_3$, $CH_2=CH(CH_3)_2SiOSi(CH_3)_2CH=CH_2$ and $C_6H_5(CH_3)_2SiOSi(CH_3)_2C_6H_5$.

In the practice of the invention, a mixture of the MQ resin and the functionalized organosilicon source material can be heated to a temperature in the range of 50–150° C. in the presence of an inert organic solvent to produce a mixture having about 10–90% by weight solids. Suitable inert organic solvents include aromatic hydrocarbons such as toluene and aliphatic hydrocarbons such as mineral spirits, hexane, and heptane. The mixture can be agitated, for example stirred and refluxed, for a period of about 0.5–12 hours. Termination of the reaction can be monitored by proton and Si-29 nuclear magnetic resonance spectroscopy. Recovery of the functionalized MQ resin can be achieved by pouring the reaction into a precipitating solvent, such as methanol, followed by filtration or centrifugation.

The invention is illustrated by the following examples. All parts are by weight unless otherwise indicated.

EXAMPLE 1

A mixture of 10 g of an MQ resin having the stoichiometry $[(CH_3)_3SiO_{1/2}]_{0.65}SiO_{4/2}$, 10 of toluene, 1.3 g of tetramethyldisiloxane and 500 ppm of LPNC was stirred and refluxed over 8 hours. Gas chromatographic analysis showed the formation of pentamethyldisiloxane and hexamethyldisiloxane as by-products of an exchange reaction. The reaction mixture was poured into methanol which resulted in a white precipitate. The product was filtered, washed with methanol, and dried in a vacuum oven. The product was shown by NMR spectroscopy to have undergone 20 mole percent exchange of $(CH_3)_3SiO-$ groups with incorporation of M(H) groups. Its identity was also confirmed by GPC. The product is useful as a crosslinking agent in a heat curable silicone composition.

EXAMPLE 2

A mixture of 7.5 g of the MQ resin of Example 1, 7.5 g of toluene, 3g of tetramethyldivinyldisiloxane and 500 ppm of LPNC was stirred and refluxed over 18 hours. Gas chromatographic analysis showed the formation of pentamethylvinyldisiloxane and hexamethyldisiloxane as by-products. The reaction mixture was poured into methanol. The resulting white precipitate was recovered by filtration, washed and dried in a vacuum oven. The product was shown by NMR spectroscopy to have undergone 39 mole percent exchange of $(CH_3)_3SiO-$ groups with incorporation of M(vinyl) groups.

EXAMPLE 3

The procedure of Example 2 was repeated, except that 2 g of tetramethyldiphenyldisiloxane was substituted for the tetramethyldivinyldisiloxane. The product was shown by NMR spectroscopy to have undergone 25 mole percent exchange of $(CH_3)_3SiO-$ groups with incorporation of M(phenyl) groups. The functionalized MQ resin is useful as an additive for modifying the refractive index of deep section cured heat-curable silicone compositions.

EXAMPLE 4

The procedure of Example 2 was repeated, except that decamethyltetrasiloxane was substituted for the tetramethyldivinyldisiloxane. Gas chromatographic analysis showed the formation of several low molecular weight by-products of the exchange reactions. The product was shown by NMR spectroscopy to have undergone exchange of $(CH_3)_3SiO-$ groups with incorporation of D units.

EXAMPLE 5

A mixture of 50 g of the MQ resin of Example 1,25 g of 3,3,3,-trifluoropropyldimethylchlorosilane, 70 g of toluene, and 300 ppm of LPNC was stirred and refluxed over 10 hrs. The product was recovered in accordance with Example 1. The resulting MQ resin is useful in making solvent-resistant heat curable silicone resins.

EXAMPLE 6

The procedure of Example 1 was repeated, substituting 500 ppm of triflic acid for the LPNC. A similar product was obtained.

What is claimed is:

1. A method for making a substantially silanol-free functionalized MQ resin which comprises effecting reaction between (A) 10 to 100 parts by weight of a functionalized organosilicon source material selected from the group consisting of organohalosilanes and organosiloxanes and having radicals selected from the group consisting of dialkylsilyl, alkenyldialkylsilyl, aryldialkylsilyl and haloalkyldialkylsilyl, and (B) 100 parts by weight of an MQ resin having about 30–70 mole percent of M units based on total silicon-containing units, in the presence of about 10–10,000 ppm of a catalytic material comprising a linear phosphonitrilic halide, a linear phosphazene having 0–4 $NPCl_2$ units or an acid having a negative $pK_a$.

2. A method in accordance with claim 1 where the functionalized organosilicon source material is a chlorosilane.

3. A method in accordance with claim 1 where the functionalized organosilicon source material is a disiloxane.

4. A method in accordance with claim 1 where the functionalized organosilicon source material has a $H(CH_3)_2SiO-$ unit.

5. A method in accordance with claim 1 where the functionalized organosilicon source material has a $CH_2=CH(CH_3)_2SiO-$ unit.

6. A method in accordance with claim 1 where the functionalized organosilicon source material has a $CF_3CH_2CH_2(CH_3)_2SiO-$ unit.

7. A method in accordance with claim 1 where the catalytic material is a linear phosphonitrilic chloride.

8. A method in accordance with claim 1 where the catalytic material is a linear phosphazene.

9. A method in accordance with claim 1 where the catalytic material is trifluoromethanesulfonic acid.

* * * * *